United States Patent [19]

Mafune et al.

[11] Patent Number: 5,571,313
[45] Date of Patent: Nov. 5, 1996

[54] INK-JET INK

[75] Inventors: Kumiko Mafune, Kawasaki; Mayumi Yamamoto; Akira Nagashima, both of Tokyo; Mikio Sanada, Yokohama; Eriko Saito, Fujisawa, all of Japan

[73] Assignee: Canon Kabushiki Kaisha, Tokyo, Japan

[21] Appl. No.: 520,640

[22] Filed: Aug. 29, 1995

[30] Foreign Application Priority Data

Aug. 31, 1994 [JP] Japan .................... 6-228985

[51] Int. Cl.⁶ .................... C09D 11/02
[52] U.S. Cl. .................... 106/22 H; 106/22 R
[58] Field of Search .................... 106/22 H, 22 R

[56] References Cited

U.S. PATENT DOCUMENTS

| | | | |
|---|---|---|---|
| 4,963,189 | 10/1990 | Hindagolla | 106/22 |
| 5,017,224 | 5/1991 | Tomita et al. | 106/22 |
| 5,019,164 | 5/1991 | Tomita et al. | 106/22 |
| 5,062,892 | 11/1991 | Halko | 106/22 |
| 5,078,790 | 1/1992 | Tochihara et al. | 106/20 |
| 5,080,716 | 1/1992 | Aoki et al. | 106/20 |
| 5,131,949 | 7/1992 | Tochihara et al. | 106/20 |
| 5,132,700 | 7/1992 | Tochihara et al. | 346/1.1 |
| 5,213,613 | 5/1993 | Nagashima et al. | 106/20 R |
| 5,258,066 | 11/1993 | Kobayashi et al. | 106/22 R |
| 5,296,022 | 3/1994 | Kobayashi et al. | 106/20 D |
| 5,370,731 | 12/1994 | Yamashita et al. | 106/22 H |
| 5,409,529 | 4/1995 | Nagashima et al. | 106/22 H |
| 5,415,686 | 5/1995 | Kurabayashi et al. | 106/26 R |
| 5,421,868 | 6/1995 | Ayalia-Esquilin et al. | 106/22 H |
| 5,431,722 | 7/1995 | Yamashita et al. | 106/22 H |

FOREIGN PATENT DOCUMENTS

| | | |
|---|---|---|
| 2-255876 | 10/1990 | Japan . |
| 2-296878 | 12/1990 | Japan . |
| 3-91577 | 4/1991 | Japan . |
| 3-160070 | 7/1991 | Japan . |

*Primary Examiner*—Helene Klemanski
*Attorney, Agent, or Firm*—Fitzpatrick, Cella, Harper & Scinto

[57] ABSTRACT

Disclosed herein is an ink-jet ink comprising in combination at least one compound selected from nitrogen compounds consisting of secondary amines and derivatives thereof, tertiary amines and derivative thereof, and complexes thereof and having at least one group selected from the group consisting of alkyl groups, a carboxyl group and the salts thereof, and a sulfonic group and the salts thereof, and a cyclic phosphate in a liquid medium in which a dye is dissolved or dispersed.

15 Claims, No Drawings

INK-JET INK

BACKGROUND OF THE INVENTION

1. Field of the Invention

The present invention relates to an ink-jet ink, and further particularly to an ink-jet ink which can provide images excellent in water fastness upon recording on non-coated paper (so-called plain paper) such as paper for copying, paper for reporting, notepaper, letter paper, bond paper and continuous business forms, which are commonly used in offices and homes, and is excellent in ejection stability and resistance to kogation and suitable for ink-jet recording systems using thermal energy.

2. Related Background Art

Inks with greatly various manners of being composed have heretofore been reported in respect of ink-jet inks. Such ink-jet inks are required to have the following performance characteristics:

(1) providing bright images high in optical density;

(2) providing high-quality images free of any undefined or irregular feathering;

(3) having high fixing ability to recording media;

(4) providing prints excellent in water fastness and light fastness:

(5) causing no clogging at minute ejection orifices of recording apparatus;

(6) having good storage stability;

(7) having high safety; and (8) being excellent in thermal ejection stability.

Of these performance characteristics, in recent years, the provision of images excellent in water fastness upon recording on so-called plain paper such as paper for copying, paper for reporting, notepaper, letter paper, bond paper and continuous business forms, which are commonly used in offices, is particularly required.

If an ink is used in an ink-jet recording apparatus of a system that droplets of the ink are ejected from an orifice by applying thermal energy from a heating element to the ink, thereby conducting recording, so-called kogation, i.e., a phenomenon that components such as a dye in the ink are thermally decomposed by this thermal energy from the heating element and built up on the heating element in the form of an insoluble matter, may be caused, whereby disadvantages such that a recorded image is deteriorated and the service life of the apparatus is shortened may be brought. Accordingly, it is important performance characteristics required of ink-jet inks to cause no kogation even when its ejection is repeated for a long period of time and not to adversely affect ejection property. It is also desirable that its ejection be more frequent.

When one attempts to prepare an ink satisfying other performance characteristics required of ink-jet inks as described above, there is however a problem that the composition of the ink comes to be a composition liable to cause kogation. For example, the provision of an image high in optical density requires to apply higher thermal energy to an ink, and a water-insoluble component must be contained as a composition satisfying the condition as to the water fastness of images, which has been required in recent years, so that the problem of kogation tends to occur. There is thus a demand for development of an ink-jet ink which provides images excellent in water fastness and moreover causes no kogation even when high thermal energy is applied to the ink.

Detailed researches and developments have been made from various approaches such as composition and physical properties of inks so that these conditions are satisfied. However, any ink satisfying all the conditions has not been yet found. For example, Japanese Patent Application Laid-Open Nos. 2-296878 and 2-255876 have proposed water-based ink compositions containing a polyamine. In such an ink, however, the hydrophilic group moiety of a dye is converted to a salt, so that the solution stability of the ink is lowered, and the lowering of reliability such as kogation and clogging at ejection orifices, and bronzing on a printed image are caused, resulting in uneven printing and/or insufficient optical density of the image. With a view toward enhancing the solution stability of an ink, it is also considered that a solution stabilizer is contained in the ink. In this instance, however, the solution stabilizer must be contained in a great amount, so that the quality of a recorded image formed by using such an ink is deteriorated.

Japanese Patent Application Laid-Open No. 3-91577 has proposed a method of improving the water fastness of the resulting image by converting a dye of a specific structure having a carboxyl group to an ammonium salt or volatile substituted ammonium salt and volatilizing ammonia or an amine out of the ink on a recording medium to form a free acid. Even in this instance, however, ammonia or the amine gradually volatilizes out of the ink, whereby the solution stability of the ink is lowered, which may often form the cause of kogation, clogging and lowering of stability of the ink, though the initial solution stability of the ink is improved.

With respect to the improvement of kogation, Japanese Patent Application Laid-Open No. 3-160070 mentions an improvement in preventing kogation by containing an oxo anion, in particular, a phosphate ion. In this instance, a divalent or trivalent metal ion may form an insoluble salt with the phosphate ion if such a metal ion exists in the ink or a flow path of the ink, so that the cause of kogation may be rather formed in some cases.

SUMMARY OF THE INVENTION

It is accordingly an object of the present invention to provide an ink-jet ink which can provide images excellent in water fastness upon recording on non-coated paper (so-called plain paper) such as paper for copying, paper for reporting, notepaper, letter paper, bond paper and continuous business forms, which are commonly used in offices and homes, and is excellent in resistance to kogation and ejection stability.

Another object of the present invention to provide an ink-jet ink which provides high-quality images bright, high in optical density and free of any undefined or irregular feathering, solves the problem of clogging at nozzles and satisfies all the performance characteristics required of ink-jet inks.

The above objects can be achieved by the present invention described below.

According to the present invention, there is thus provided an ink-jet ink comprising in combination at least one compound selected from nitrogen compounds consisting of secondary amines and derivatives thereof, tertiary amines and derivative thereof, and complexes thereof and having at least one group selected from the group consisting of alkyl groups, a carboxyl group and the salts thereof, and a sulfonic group and the salts thereof, and a cyclic phosphate in a liquid medium in which a dye is dissolved or dispersed.

DESCRIPTION OF THE PREFERRED EMBODIMENTS

The present inventors have carried out an extensive investigation on various manners of ink compositions. As a result, it has been found that when a specific nitrogen compound and a specific cyclic phosphate compound are contained in an ink comprising a dye and a liquid medium, the ink can be provided as an ink which can provide images excellent in water fastness and is excellent in resistance to kogation and ejection stability, and a phosphate ion is allowed to stably exist without forming an insoluble salt with a divalent or trivalent metal ion to cause kogation if such a metal ion exists in the ink or a flow path of the ink, and further found that such an ink provides recorded images as high-quality images high in optical density and free of any undefined or irregular feathering and causes no clogging at nozzles, thus leading to completion of the present invention.

The present invention will hereinafter be described in more detail with reference to preferred embodiments.

The ink-jet ink according to the present invention comprises a dye, a liquid medium dissolving or dispersing the dye therein and at least one compound selected from nitrogen compounds consisting of secondary amines and derivatives thereof, tertiary amines and derivative thereof, and complexes thereof and having at least one group selected from the group consisting of alkyl groups, a carboxyl group and the salts thereof, and a sulfonic group and the salts thereof, wherein at least one cyclic phosphate is contained in the ink. The ink-jet ink may further comprise a sulfate.

The nitrogen compound making up the ink according to the present invention is at least one compound selected from the group consisting of secondary amines and derivatives thereof, tertiary amines and derivative thereof, and complexes thereof. Such a compound has at least one group selected from the group consisting of alkyl groups, a carboxyl group and the salts thereof, and a sulfonic group and the salts thereof. In the present invention, any compound may be used so far as it satisfies the above-described requirements. It is however preferable to use a compound represented by the general formula

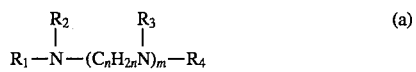

wherein $R_1$, $R_2$, $R_3$ and $R_4$ independently denote hydrogen or a hydrocarbon group having 1 to 48 carbon atoms, which may be substituted by an alkylamino group, a carboxyl group or a salt thereof, or a sulfonic group or a salt thereof, at least one of $R_1$, $R_2$, $R_3$ and $R_4$ is hydrocarbon group having at least 6 carbon atoms, n is an integer of 2 to 4, and m is an integer of 1 to 99.

A further preferred compound is a compound in which at least one of $R_1$, $R_2$, $R_3$ and $R_4$ in the general formula (a) is an organic group having a carboxyl group or a salt-formed group thereof, or a sulfonic group or a salt-formed group thereof.

Specific examples of these nitrogen compounds include derivatives of diamines such as ethylenediamine, propylenediamine, tetramethylenediamine and pentamethylenediamine; derivatives of polyamines such as 1,2,3-triaminopropane, tris(2-aminoethyl)amine and tetra(aminomethyl)methane; and derivatives of polyalkylenepolyamines such as diethylenetriamine, triethylenetetramine, tetraethylenepentamine and heptaethyleneoctamine, at least one of hydrogen atoms bonded to nitrogen atoms of said polyamine derivatives being substituted by a hydrocarbon group having at least 6, preferably 6 to 48 carbon atoms. Specific examples of the hydrocarbon group include alkyl group such as hexyl, octyl and lauryl groups, which may have a substituent group, and aromatic groups such as phenyl, naphthyl and anthranyl group, which may have a substituent group. More specific examples of the polyamine derivatives include octyldiethylenetriamine, lauryldiethylenetriamine, laurylaminopropylamine, tetradecyldiethylenetriamine, phenyldiethylenetriamine, 1,3-dihexyldiethylenetriamine, phenyltriethylenetetramine, hexyltriethylenetetramine, octyltriethylenetetramine, 1,1'-dioctyltriethylenetetramine, octyltetraethylenepentamine, lauryltriethylenetetramine, 1,1'-dioctyltetraethylenepentamine, lauryltetraethylenepentamine, 1,1'-diphenyltetraethylenepentamine and decylheptaethyleneoctamine. Further, other preferable compounds include laurylheptaethyleneoctamine, tetradecylheptaethyleneoctamine, 1,1'-dilaurylheptaethyleneoctamine, 1,1'-ditetradecylheptaethyleneoctamine and the like. Compounds represented by the following structural formulae may also be mentioned. However, the present invention is not limited to these specific examples.

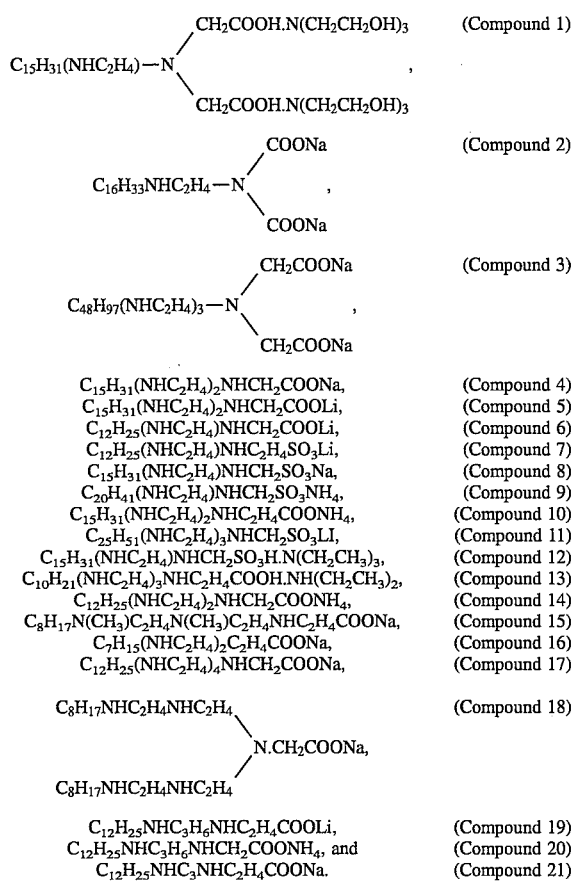

The content of the nitrogen compounds, such as those described above, in the ink is preferably within a range of from 0.01 to 20% by weight, more preferably from 0.1 to 10% by weight from the viewpoints of the water fastness of the resulting images, the ejection characteristics and the reliability of ejection stability.

Examples of the cyclic phosphate making up the ink according to the present invention include trimetaphosphates, tetrametaphosphates and hexametaphosphates. Examples of cations of such salts include $Na^+$, $Li^+$ and $NH_4^+$. The content of the cyclic phosphate is preferably within a range of from 0.005 to 0.5% by weight, more preferably from 0.01 to 0.2% by weight from the viewpoints for obtaining the effect sufficiently and of an influence on the surface of a heater, which is a heating element, and the ejection reliability and the water fastness.

In the present invention, when a sulfate is further contained in the ink containing the specific nitrogen compound and cyclic phosphate as described above, the cyclic phosphate is allowed to stably exist in the ink, and the water fastness of the resulting images is also improved. Examples of the sulfate used in the present invention include sodium sulfate, lithium sulfate and ammonium sulfate. Of these, ammonium sulfate is most preferred in that images excellent in water fastness are provided. The content of the sulfate is preferably within a range of from 0.05 to 5.0% by weight, more preferably from 0.1 to 1.0% by weight from the viewpoints for obtaining the effect sufficiently and of the ejection reliability.

No particular limitation is imposed on the dye making up the ink according to the present invention. For example, acid dyes, basic dyes and direct dyes are however more effective. Examples thereof include C.I. Food Black 1, C.I. Food Black 2, C.I. Direct Black 154, C.I. Direct Black 168, C.I. Direct Black 195, C.I. Direct Yellow 142, C.I. Direct Yellow 86, C.I. Direct Red 227 and C.I. Direct Blue 199. The content of these dyes in the ink is preferably within a range of from 0.1 to 15% by weight, more preferably from 0.1 to 10% by weight.

The liquid medium making up the ink according to the present invention is preferably a mixed solvent of water and a water-soluble organic solvent. Specific examples of the water-soluble organic solvent include amides such as dimethylformamide and dimethylacetamide; ketones such as acetone; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, hexylene glycol and diethylene glycol; thiodiglycol; glycerol; 1,2,6-hexanetriol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 1,3-dimethyl-2-imidazolidinone; triethanolamine; sulfolane; dimethylsulfoxide; cyclic amide compounds such as 2-pyrrolidone and ε-caprolactam; and imide compounds such as succinimide.

In general, the content of the water-soluble organic solvent in the ink is preferably within a range of from 1 to 40% by weight, more preferably, from 3 to 30% by weight based on the total weight of the ink.

The content of water used in the ink is within a range of from 30 to 95% by weight. If the amount of water is less than 30% by weight, the solubility of the dye is deteriorated, and the viscosity of a resulting ink is increased. It is hence not preferable to use water in such a small amount. On the other hand, if the amount of water is greater than 95% by weight, the vaporizing components are too great to satisfy sufficient crusting property.

Besides the above components, various additives such as surfactants, pH adjustors, rust preventives, antiseptics, mildewproofing agents, anti-oxidants, vaporization accelerators, chelating agents and insoluble polymers may be added to the ink according to the present invention as needed.

The ink according to the present invention is desirably controlled so as to have, as its own physical properties, a surface tension of 30 to 68 dyn/cm and a viscosity of 15 cP or lower, preferably 10 cP or lower, more preferably 5 cP or lower as measured at 25° C. from the viewpoint of making the matching of the ink with a head for ink-jet good.

The present invention will hereinafter be described more specifically by the following Examples and Comparative Examples. Incidentally, all designations of "part" or "parts" and "%" as will be used in the following examples mean part or parts by weight and % by weight unless expressly noted.

EXAMPLES 1 TO 5

After their corresponding components shown in Table 1 were mixed and thoroughly stirred into solutions, the solutions were separately filtered under pressure through a "Fluoropore Filter" (trade name; product of Sumitomo Electric Industries, Ltd.) having a pore size of 0.45 μm, thereby preparing respective inks according to the examples of the present invention.

Comparative Examples 1 to 5

Their corresponding components shown in Table 2 were used to follow the same procedure as in the examples, thereby preparing respective inks of the comparative examples.

TABLE 1

Compositions of inks of Examples (Unit: % by weight)

| Component | Example | | | | |
|---|---|---|---|---|---|
| | 1 | 2 | 3 | 4 | 5 |
| C.I. Direct Black 168 | 1.5 | 1.5 | | | |
| C.I. Food Black 1 | 1.5 | 1.5 | | | |
| C.I. Direct Black 195 (ammonium salt) | | | 2.5 | 2.5 | |
| C.I. Direct Blue 199 | | | | | 2 |
| Diethylene glycol | | | | | 10 |
| Thiodiglycol | 7 | 7 | 10 | 10 | |
| Glycerol | 5 | 5 | | | |
| Urea | | | 5 | 5 | 2.5 |
| Ethanol | 4 | 4 | | | |
| Isopropanol | | | 3 | 3 | |
| Compound 20 | | | 2.5 | | |
| Compound 21 | 2 | | | 3 | |
| Compound 14 | | 2 | | | 2 |
| Sodium hexametaphosphate | 0.1 | 0.02 | 0.02 | 0.02 | 0.05 |
| Ammonium sulfate | 0.2 | 0.2 | 0.5 | 0.2 | 0.1 |
| Sodium hydroxide | | | 0.2 | | |
| Water | 78.70 | 78.78 | 76.28 | 76.28 | 83.35 |

TABLE 2

Compositions of inks of Comp. Exs. (Unit: % by weight)

| Component | Comparative Example | | | | |
|---|---|---|---|---|---|
| | 1 | 2 | 3 | 4 | 5 |
| C.I. Direct Black 168 | 1.5 | 1.5 | | | |
| C.I. Food Black 1 | 1.5 | 1.5 | | | |
| C.I. Direct Black 195 (ammonium salt) | | | 2.5 | 2.5 | |
| C.I. Direct Blue 199 | | | | | 2 |
| Diethylene glycol | | | | | 10 |
| Thiodiglycol | 7 | 7 | 10 | 10 | |
| Glycerol | 5 | 5 | | | |
| Urea | | | 5 | 5 | 2.5 |
| Ethanol | 4 | 4 | | | |
| Isopropanol | | | 3 | 3 | |
| Compound 14 | | 2 | | | 2 |
| Compound 20 | | | 2.5 | | |

TABLE 2-continued

Compositions of inks of Comp. Exs. (Unit: % by weight)

| Component | Comparative Example | | | | |
|---|---|---|---|---|---|
| | 1 | 2 | 3 | 4 | 5 |
| Compound 21 | 2 | | | 3 | |
| Sodium hydroxide | | | 0.2 | | |
| Ammonium sulfate | 0.2 | 0.2 | | 0.2 | 0.1 |
| Water | 78.80 | 78.80 | 76.80 | 76.30 | 83.40 |

Using each of the inks obtained in Examples 1 to 5 and Comparative Examples 1 to 5, printing test was then conducted using, as an ink-jet recording apparatus, an On-Demand. type ink-jet printer making use of a heating element as an ejection-energy source for the ink to evaluate the ink as to (1) resistance to kogation and (2) water fastness. Methods and standards for the evaluation are as described below. The results are shown in Tables 3 and 4.

Methods and Standards for Evaluation:

(1) Resistance to kogation:

After each of the ink samples was ejected repeatedly $1\times10^8$ times by means of the printer, printing was conducted on SK paper (Canon NP Dry SK). The state of surface of the heater and the resultant print were observed to rank the ink sample as to the resistance to kogation in accordance with the following standard:

(a) On the heater surface:
  A: No deposit was observed on the heater;
  B: Deposit was somewhat observed on the heater; and
  C: Deposit was observed in plenty on the heater.

(b) On the print:
  A: Neither reduction in dot diameter nor disorder of ejection was observed;
  B: Reduction in dot diameter or disorder of ejection was somewhat observed; and
  C: Sharp reduction in dot diameter, ejection failure or print irregularity was observed.

(2) Water fastness:

Solid printing was conducted with each ink sample on SK paper (Canon NP Dry SK) by the printer. After the resulting print was left over for at least 1 hour, the optical density of the print was measured by a Macbeth RD915 (trade name; manufactured by Macbeth Company). After the print was then immersed for 3 minutes in a container filled with water, it was allowed to stand and dried to measure its optical density again, whereby the percent retention of the optical density of the print was calculated to rank the ink sample as to the water fastness of the print in accordance with the following standard:

AA: Percent retention of the optical density was not lower than 95%;

A: Percent retention of the optical density ranged from 80% to 94%;

B: Percent retention of the optical density ranged from 66% to 79%; and

C: Percent retention of the optical density was not higher than 65.

TABLE 3

Evaluation results of Examples

| | Example | | | | |
|---|---|---|---|---|---|
| | 1 | 2 | 3 | 4 | 5 |
| (1) Resistance to kogation | | | | | |
| a | A | A | A | A | A |
| b | A | A | A | A | A |
| (2) Water fastness | A | A | AA | AA | A |

TABLE 4

Evaluation results of Comparative Examples

| | Comparative Example | | | | |
|---|---|---|---|---|---|
| | 1 | 2 | 3 | 4 | 5 |
| (1) Resistance to kogation | | | | | |
| a | C | C | B | C | C |
| b | C | C | B | C | C |
| (2) Water fastness | A | A | A | AA | A |

According to the present invention, as described above, there are provided ink-jet inks excellent in resistance to kogation and ejection stability, which provide images excellent in water fastness even when recording is conducted on so-called plain paper such as paper for copying, commonly used in offices and homes. The present invention also provides ink-jet inks which can provide high-quality recorded images high in optical density and free of any feathering and raise no problem of clogging at nozzles.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink-jet ink comprising in combination at least one compound selected from nitrogen compounds consisting of secondary amines and derivatives thereof, tertiary amines and derivatives thereof, and complexes thereof and having at least one group selected from the group consisting of alkyl groups, a carboxyl group and the salts thereof, and a sulfonic group and the salts thereof; and a cyclic phosphate in a liquid medium in which a dye is dissolved or dispersed.

2. The ink according to claim 1, further comprising a sulfate.

3. The ink according to claim 1, wherein the nitrogen compound is a compound represented by the general formula $$R_1-N(R_2)-(C_nH_{2n}N(R_3))_m-R_4 \quad (a)$$

wherein $R_1$, $R_2$, $R_3$ and $R_4$ independently denote hydrogen or a hydrocarbon group having 1 to 48 carbon atoms, which may be substituted by an alkylamino group, a carboxyl group or a salt thereof, or a sulfonic group or a salt thereof, at least one of $R_1$, $R_2$, $R_3$ and $R_4$ is hydrocarbon group having at least 6 carbon atoms, n is an integer of 2 to 4, and m is an integer of 1 to 99.

4. The ink according to claim 1, wherein the cyclic phosphate is a trimetaphosphate, tetrametaphosphate or hexametaphosphate.

5. The ink according to claim 1, wherein the cyclic phosphate is sodium trimetaphosphate, sodium tetrametaphosphate or sodium hexametaphosphate.

6. The ink according to claim 1, wherein the cyclic phosphate is contained within a range of from 0.005 to 0.5% by weight.

7. The ink according to claim 1, wherein the cyclic phosphate is contained within a range of from 0.01 to 0.2% by weight.

8. The ink according to claim 2, wherein the sulfate is sodium sulfate, lithium sulfate or ammonium sulfate.

9. The ink according to claim 2, wherein the sulfate is contained within a range of from 0.05 to 5.0% by weight.

10. The ink according to claim 2, wherein the sulfate is contained within a range of from 0.1 to 1.0% by weight.

11. The ink according to claim 1 or 2, which is suitable for ink-jet systems using thermal energy.

12. The ink according to claim 1, wherein the nitrogen compound is contained within a range of from 0.01 to 20% by weight.

13. The ink according to claim 1, wherein the nitrogen compound is contained within a range of from 0.1 to 10% by weight.

14. The ink according to claim 1, wherein the liquid medium comprises water and a water-soluble organic solvent.

15. The ink according to claim 1, wherein the dye is an acid dye, a basic dye or a direct dye.

* * * * *

UNITED STATES PATENT AND TRADEMARK OFFICE
CERTIFICATE OF CORRECTION

PATENT NO. : 5,571,313
DATED : November 5, 1996
INVENTOR(S) : KUMIKO MAFUNE, ET AL.

Page 1 of 2

It is certified that error appears in the above-indentified patent and that said Letters Patent is hereby corrected as shown below:

On the title page, item

[57] ABSTRACT:

Line 4, "derivative" should read --derivatives--.

COLUMN 1:

Line 28, "fastness:" should read --fastness;--.
Line 51, "it is important performance characteristics" should read --it is an important performance characteristic--.

COLUMN 2:

Line 40, delete "rather".
Line 53, "invention" should read --invention is--.
Line 54, "images" should read --images which are--.
Line 65, "derivative" should read --derivatives--.

COLUMN 3:

Line 29, "derivative" should read --derivatives--.
Line 38, "derivative" should read --derivatives--.

UNITED STATES PATENT AND TRADEMARK OFFICE
CERTIFICATE OF CORRECTION

PATENT NO. : 5,571,313
DATED : November 5, 1996
INVENTOR(S) : KUMIKO MAFUNE, ET AL.

It is certified that error appears in the above-indentified patent and that said Letters Patent is hereby corrected as shown below:

COLUMN 4:

Line 57, "$C_{12}H_{25}NHC_3NHC_2H_4COONa.$" should read --$C_{12}H_{25}NHC_3H_6NHC_2H_4COONa.$--;

COLUMN 7:

Line 15, "printing" should read --a printing--.
Line 17, "Demand." should read --Demand--.
Line 27, "surface" should read --the surface--.
Line 30, "standard:" should read --standards:--.
Line 57, "standard:" should read --standards:--.
Line 67, "65." should read --65%.--.

Signed and Sealed this

Fifteenth Day of April, 1997

Attest:

BRUCE LEHMAN

Attesting Officer        Commissioner of Patents and Trademarks